United States Patent [19]
Ho

[11] Patent Number: 6,064,855
[45] Date of Patent: May 16, 2000

[54] VOICE BOOK SYSTEM

[76] Inventor: Frederick Pak Wai Ho, 2108 W. Orange St., Alhambra, Calif. 91803

[21] Appl. No.: 09/066,996

[22] Filed: Apr. 27, 1998

[51] Int. Cl.[7] ........................................... G09B 5/00
[52] U.S. Cl. ........................... 434/317; 434/169; 434/308; 434/362; 345/901
[58] Field of Search ...................... 434/156, 169, 434/185, 307 R, 308, 309, 317, 362, 365; 345/156, 173, 901; 369/31, 64; 462/17, 55, 66; 704/258

[56] References Cited

U.S. PATENT DOCUMENTS

| | | | |
|---|---|---|---|
| 4,021,932 | 5/1977 | Lipps | 434/317 |
| 4,636,881 | 1/1987 | Brefka et al. | 434/317 X |
| 4,809,246 | 2/1989 | Jeng | 434/317 |
| 4,884,974 | 12/1989 | DeSmet | 434/317 |
| 4,990,092 | 2/1991 | Cummings | 434/317 |
| 4,997,374 | 3/1991 | Simon | 434/317 |
| 5,368,488 | 11/1994 | Gentile | 434/317 |
| 5,466,158 | 11/1995 | Smith, III | 434/317 |
| 5,484,292 | 1/1996 | McTaggard | 434/317 |
| 5,485,176 | 1/1996 | Ohara et al. | 345/173 |
| 5,534,888 | 7/1996 | Lebby et al. | 345/901 X |
| 5,624,265 | 4/1997 | Redford et al. | 434/307 R |
| 5,631,883 | 5/1997 | Li | 369/31 |
| 5,636,995 | 6/1997 | Sharpe, III et al. | 434/317 |
| 5,645,432 | 7/1997 | Jessop | 434/322 |
| 5,707,240 | 1/1998 | Haas et al. | 434/317 |
| 5,739,814 | 4/1998 | Ohara et al. | 345/173 |
| 5,807,176 | 9/1998 | Forsse et al. | 434/317 X |
| 5,810,604 | 9/1998 | Kopp, Jr. et al. | 434/317 |
| 5,813,861 | 9/1998 | Wood | 434/169 |
| 5,829,985 | 11/1998 | Campbanella | 434/317 |
| 5,888,070 | 3/1999 | La Tour et al. | 434/156 |
| 5,897,324 | 4/1999 | Tan | 434/317 |
| 5,954,514 | 9/1999 | Haas et al. | 434/317 |
| 5,991,594 | 11/1999 | Froeber et al. | 434/317 |

FOREIGN PATENT DOCUMENTS

| | | | |
|---|---|---|---|
| 0 609 048 A1 | 8/1994 | European Pat. Off. | 434/317 |

*Primary Examiner*—Joe H. Cheng
*Attorney, Agent, or Firm*—Raymond Y. Chan; David and Raymond

[57] ABSTRACT

A voice book system includes a sound generating device equipped with at least a voice book. The voice book includes a front cover, a back cover and a plurality of page sheets. The voice book further contains an information storing device for storing a plurality of sound messages with respect to the content of each of the page sheets and a book connector for electrically communicating the information storing device with the sound generating device. The sound generating device includes a housing, a book holder provided on the housing for holding the back cover of the voice book on the housing, an audio device for converting the sound messages from the voice book to speaking sound, at least a speaker for boardcasting the speaking sound, a device connector for electrically connecting with the book connector when the voice book is held on the housing by the book holder for transmitting the sound messages stored in the information storing device to the audio device, and a detecting device which is electrically communicated with the audio device for detecting which page sheet of the voice book is turned in so that the audio device will select the particular sound messages with respect to the content of that turned in page sheet which is then converted to the speaking sound to broadcast through the speaker.

26 Claims, 5 Drawing Sheets

VOICE BOOK SYSTEM

BACKGROUND OF THE PRESENT INVENTION

The present invention relates to books, and more particularly to a voice book system which comprises a sound generating device adapted to equip with a specifically constructed voice book in order to read out the content of the book for blind people and children.

Most people enjoy reading for amusement and gaining knowledge. Unluckily, blind people are not capable to read. They can only read by touching that is slow and inefficient. A book that can read out its content is absolutely an ideal of most blind people.

Besides, babies learn how to speak before how to read; therefore it is a great headache for every parent to teach his or her pre-school child to read. Parents have to repeatedly read the content of a book word by word until the children recognize the meaning of each word. Moreover, many kids would like to listen to their parents' reading of their favorite storybook before sleeping. It is an additional burden to a parent who has been worked for a busy day. Therefore, it is certainly an excellent idea for every parent to have a voice book that can read out its story by itself so that his or her child can view the drawings of the book and listen to its story at the same time.

Furthermore, the major difficulty of language students is that they are not sure whether their pronunciation is correct or not. Therefore, it is a long felt need for every language student to have a voice book that can read out its content by itself. It is the most efficient way to study the correct pronunciation and learn by heart the vocabularies.

SUMMARY OF THE PRESENT INVENTION

It is thus a first object of the present invention to provide a voice book system which comprises a sound generating device adapted to equip with a specifically constructed voice book in order to read out the content of the book for blind people, children and language student.

A further object of the present invention is to provide a voice book system wherein the audio content of the voice book is stored in the book and the sound generating device is generally adapted to equip with every voice book.

Yet another object of the present invention is to provide a voice book system in which the sound generating device will only read out the particular page that the reader is reading.

Still another object of the present invention is to provide a voice book system wherein its sound generating device can generate a specific background music for each particular page content of the voice book in order to enhance the artistic appeal and sensation of the book content.

In order to accomplish the above objects, the present invention provides a voice book system which comprises a sound generating device equipped with at least a voice book.

The voice book comprises a front cover, a back cover and a plurality of page sheets bound between the front cover and the back cover for respectively printing a predetermined content or information thereon. The voice book further contains an information storing means for storing a plurality of sound messages with respect to the content of each of the page sheets and a book connector for electrically communicating the information storing means with the sound generating device.

The sound generating device comprises a housing, a book holder provided on the housing for holding the back cover of the voice book on the housing, an audio means which is installed inside the housing for converting the sound messages from the voice book to speaking sound, at least a speaker installed inside the housing for boardcasting the speaking sound, a device connector for electrically connecting with the book connector when the voice book is held on the housing by the book holder for transmitting the sound messages stored in the information storing means to the audio means, and a detecting means which is electrically communicated with the audio means for detecting which page sheet of the voice book is turned in so that the audio means will select the particular sound messages with respect to the content of that turned in page sheet which is then converted to the speaking sound to broadcast through the speaker.

In one of the preferable embodiment of the present invention, the detecting means comprises a plurality pair of signal emitters and signal receivers disposed along a side edge of the housing, wherein each pair of the signal emitter and signal receiver must be positioned proximately. Each of the page sheets has a tab member which is protruded outwardly from an edge side thereof and disposed staggeredly, wherein each of the tab members is extended just above a respective pair of the signal emitter and signal receiver so as to shelter the detecting signal emitted from the corresponding signal emitter and reflect the detecting signal to the proximate signal receiver. In other words, when the voice book held on the housing of the sound generating device is closed, the detecting signals emitted from all the signal emitters are sheltered by the tab members and reflected to the signal receivers. At that moment, the audio means is deactivated and will not provide any sound. However, if the voice book is opened and turned in to a particular page sheet, for example page 5, the pages 1 to 4 will be turned aside so that the sheltering and reflecting of the detecting signals emitted from the respective four signal emitters will be cleared. Therefore, the audio means may detect that the reader is reading the page 5 of the voice book, so that the audio means can precisely select the sound message of the content of page 5 to convert to the speaking sound and broadcast through the speaker.

DETAILED DESCRIPTION OF THE PREFERRED EMBODIMENT

Referring to FIGS. 1 to 4, a voice book system according to a first preferred embodiment of the present invention is illustrated, which comprises a sound generating device 20 equipped with at least a voice book 10.

Figure 1:
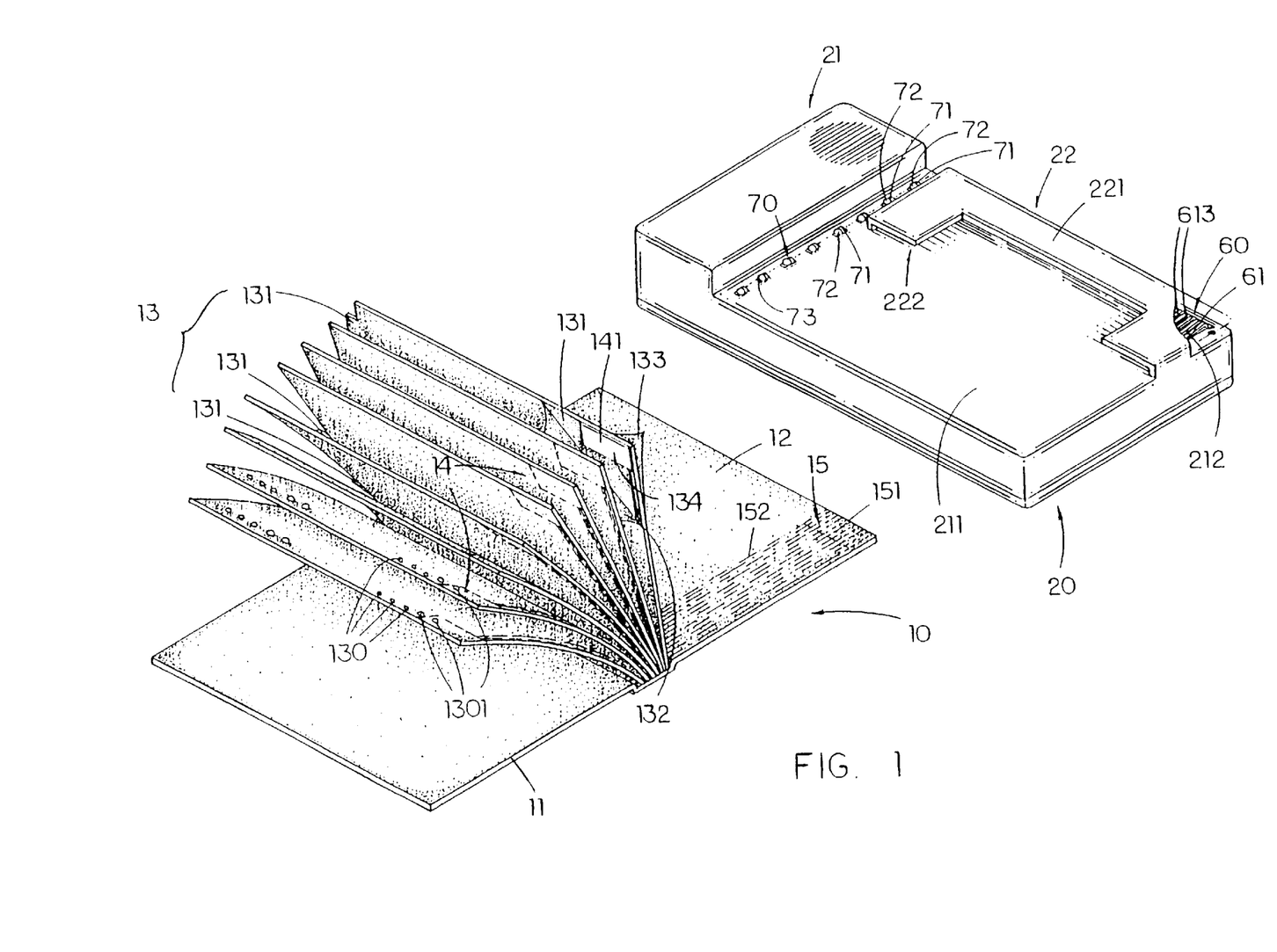
FIG. 1 is a perspective view of a first preferred embodiment in accordance with the present invention.

As shown in FIG. 1, the voice book 10 comprises a front cover 11, a back cover 12 and a plurality of page sheets 13 bound between the front cover 11 and the back cover 12 for respectively printing a predetermined content or information thereon. The voice book 10 further contains an information storing means 14 for storing a plurality of sound messages with respect to the content of each of the page sheets 13 and a book connector 15 for electrically communicating the information storing means 14 with the sound generating device 20.

Figure 2:
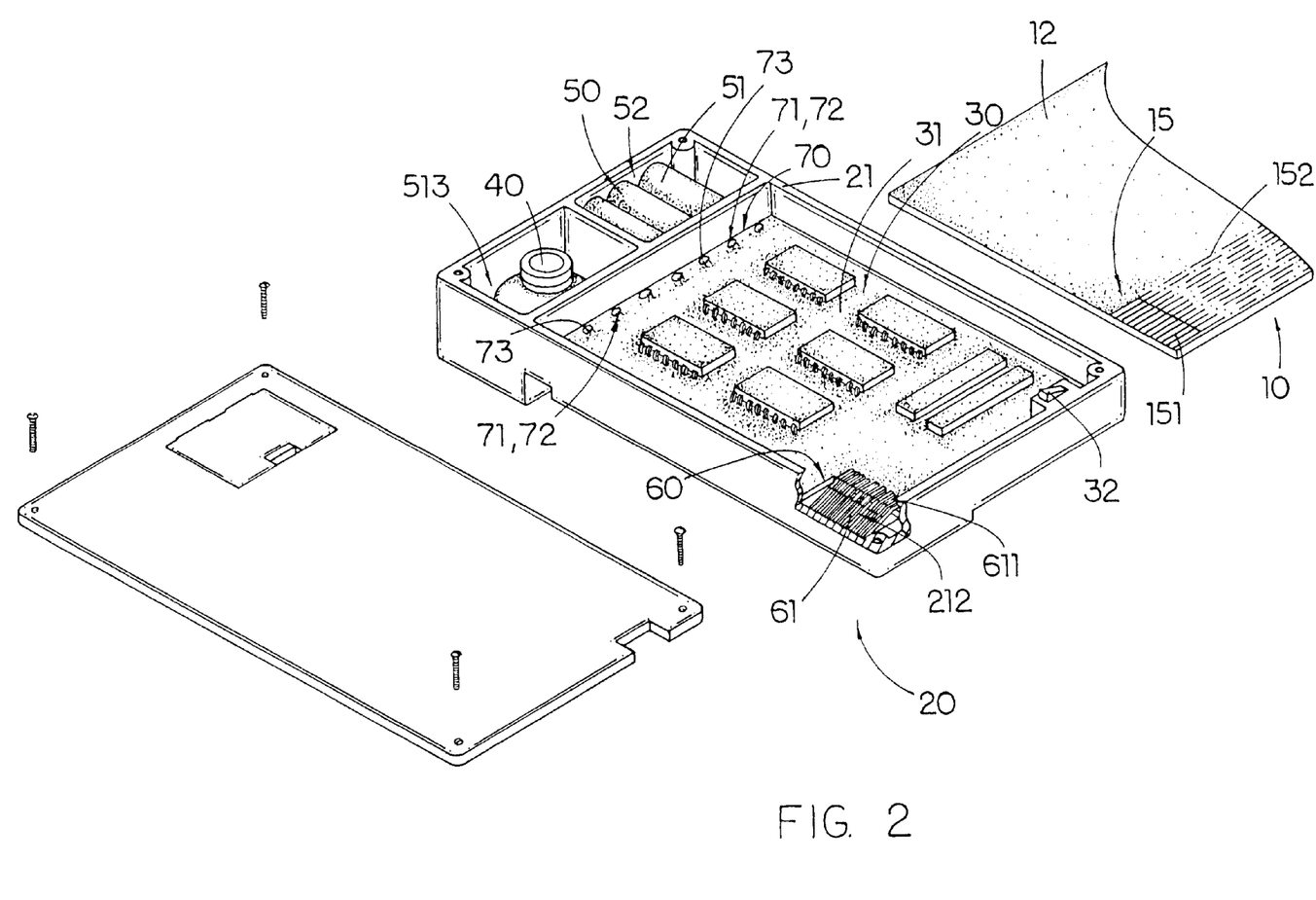
FIG. 2 is an exploded perspective view of the above first preferred embodiment in accordance with the present invention.

As shown in FIGS. 1 and 2, the sound generating device 20 comprises a housing 21, a book holder 22 provided on the housing 21 for connecting the voice book 10 with the housing 21 by holding the back cover 12 of the voice book 10 in position, an audio means 30 which is installed inside the housing 21 for converting the sound messages transmitted from the voice book 10 to speaking sound, at least a speaker 40 installed inside the housing 21 for boardcasting the speaking sound, a power source 50 electrically connected with the audio means 30 for power supply, a device connector 60 for electrically connecting with the book connector 15 when the voice book 10 is held on top of the housing 21 by the book holder 22 for transmitting the sound messages stored in the information storing means 14 to the audio means 30, and a detecting means 70 which is electrically communicated with the audio means 30 for detecting which page sheet 13 of the voice book 10 is turned in so that the audio means 30 will select the particular sound messages with respect to the content of that turned in page sheet 13 which is then converted to the speaking sound to broadcast through the speaker 40.

According to the first preferred embodiment of the present invention, as shown in FIG. 1, the information storing means 14 comprises a plurality of memory chips 141 having a predetermined thickness. Each page sheet 13 comprises a sheet body 131, which is made of a cardboard or a plastic board having a thickness at least equal to the thickness of the memory chip 141, and two cover papers 132, 133 adhered on two sides of the sheet body 131. Each sheet body 131 has a cavity 134 to receive one of the memory chips 141 therein. For example, if there are totally six page sheets 13, the information storing means 14 should comprise six memory chips 141 too. The written content, pictures and/or drawings of each page sheet 13 are printed on the two sheet papers 132, 133. A sound content which is a sound message with respect to the written content of each page sheet 13 is stored in the respective memory chip 141, where in the sound content can be a background music for the written content or a sound record of reading the written content.

A plurality of flashing lights 130, which are made of light emitting diode (LED) in color of red, green or amber for decoration purpose, and a plurality of touch switches 1301 are also mounted on each page sheet 13 so that the reader can interactive with the voice book 10.

The book connector 15, according to the preferred embodiment, as shown in FIGS. 1 and 2, comprises a plurality, of electrical contact-strip terminals 151 adjacently aligned in parallel manner. The book connector 15 is affixed to an outer bottom corner of an exterior side of the back cover 12. A plurality of electrical wires 152 are respectively connected between the contact-strip terminals 151 and the memory chips 141 so as to electrically connect each of the memory chips 141 with each of the contact-strip terminals 151. The book connector 15 also provides electrical connections for the control of the flashing lights 130 and the touch switches 1301 and the sound generating device also provides control signals for the flashing lights 130 and the touch switches 1301.

As shown in FIGS. 1 and 2, the housing 21 has a top platform 211 for supporting the back cover 12 of the voice 10 to flatly sit thereon. The book holder 22 comprises a pocket shelter 221 raised above a side edge of the top platform 211 to define a receiving pocket 222 between the top platform 211 and the pocket shelter 221, wherein a height of the receiving, pocket 222 must be slightly larger or equal to the thickness of the back cover 12 of the voice book 10, so that an outer side portion of the back cover 12 of the voice book 10 can be fitly inserted into the receiving pocket 222. The top platform 211 has a communication opening 212 which is positioned at a side corner of the top platform 211 and underneath the pocket shelter 221.

The audio means 30, which is installed inside the housing 21, comprises a circuit board 31 electrically connected with the speaker 40 and the power source 50, and a switch 32 for switching the power supply of the circuit board 31 on or off. The speaker 40 is positioned in a top compartment 213 of the housing 21 for sound broadcasting. The power source 50 comprises at least a battery 51 electrically installed inside a battery chamber 52.

Figure 3:
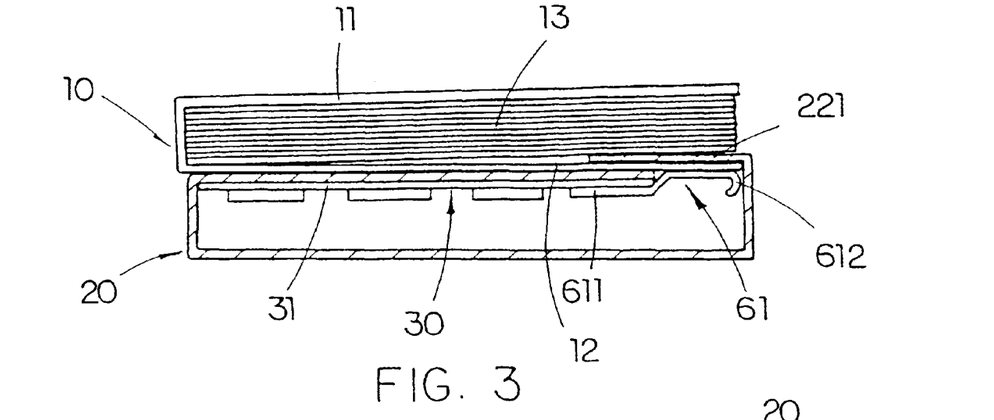
FIG. 3 is partially sectional view of the above first preferred embodiment in accordance with the present invention.

The device connector 60, as shown in FIGS. 1, 2 and 3, comprises a plurality of electrical contact springs 61 disposed at the communication opening 212 of the top platform 211. Each of the contact springs 61, which is made of resilient metal wire, has a connected leg 611 electrically connected to the circuit board 31 and an elongated arm 612 having a V-shaped tip 613 upwardly extended into the receiving pocket 222. Therefore, as shown in FIGS. 3, when the outer side portion of the back cover 12 of the voice book 10 is inserted into the receiving pocket 222 of the housing 21, the contact-strip terminals 151 of the book connector 15 will respectively press down the V-shaped tips 613 of the contact springs 61 to a lower position, so that each contact spring 61 is in good electrical contact with the respective contact-strip terminal 151. Moreover, each of the resilient contact springs 61 has a tendency to spring back to its upper position that renders each contact spring 61 propping against the respective contact-strip terminal 151 so as to ensure good electrical connection for signals or messages transmission.

In accordance with the preferred embodiment of the present invention, the detecting means 70 comprises a plurality pair of signal emitters 71 and signal receivers 72 disposed along a side edge of the top platform 211 of the housing 21. Each pair of the signal emitter 71 and signal receiver 72, which are electrically connected to the audio means 30, can be encased into a single unit shell 73 or must be positioned proximately.

The signal emitter and receiver 71, 72 can be an optical signal emitter and receiver such as an infrared emitter and receiver, wherein a detecting signal, i.e. an infrared beam, is continuously emitted upwardly from the signal emitter 71 when the switch 32 is turned on and the back cover 12 of the voice book 10 is held in position on the housing 21. When a non-transparent surface is provided above the signal emitter 71, the infrared beam will just be reflected to the signal receiver 72.

Figure 4:
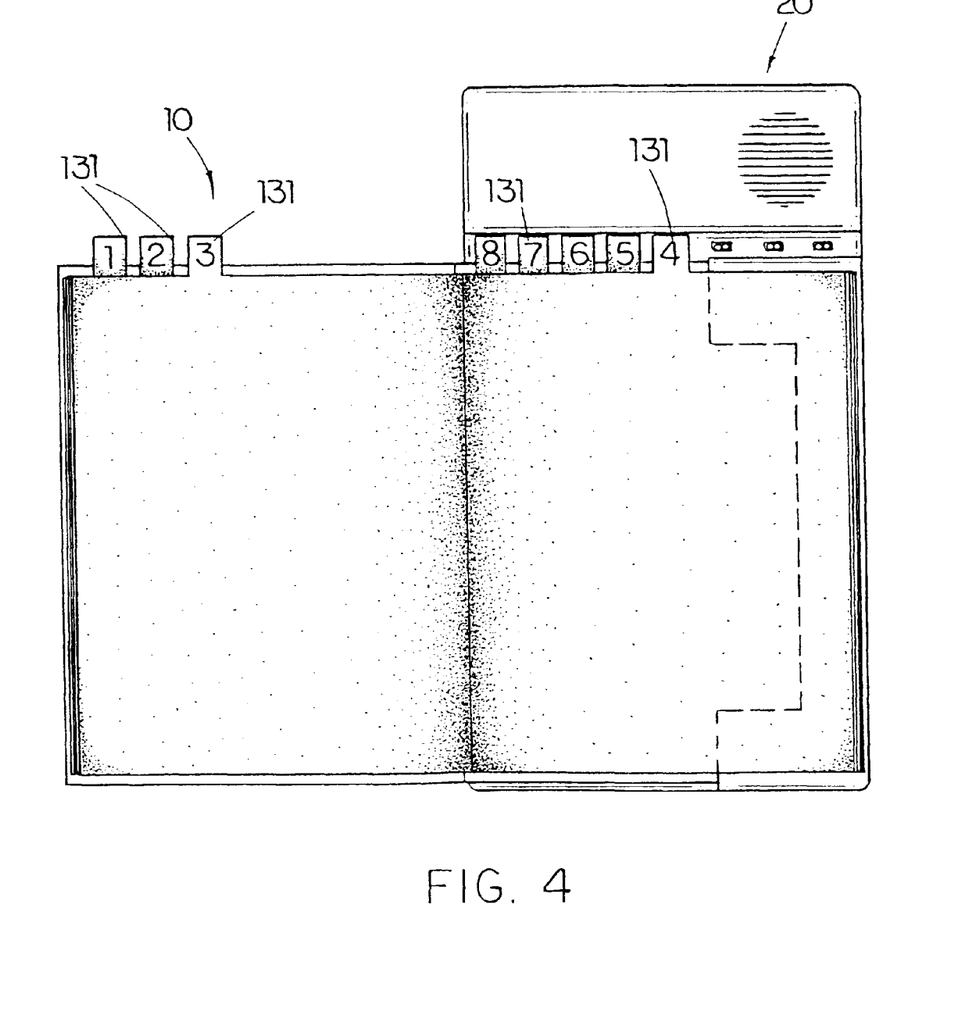
FIG. 4 is a top view of the above first preferred embodiment in accordance with the present invention.

In order to equipped with the detecting means 70 of the present invention shown in FIGS. 1 and 4, each of the page sheets 13 has a tab member 131 which is protruded outwardly from an edge side thereof and disposed staggeredly.

Moreover, each of the tab members 131 is extended just above a respective pair of the signal emitter 71 and signal receiver 72 so as to shelter the detecting signal emitted from the corresponding signal emitter 71 and reflect the detecting signal to the proximate signal receiver 72.

In other words, when the voice book 10 held on the housing 21 of the sound generating device 20 is closed, the detecting signals emitted from all the signal emitters 71 are sheltered by the tab members 131 and reflected toward the signal receivers 72. At that moment, the audio means 30 is deactivated and will not provide any sound. However, if the voice book 10 is opened and turned in to a particular page sheet 13, for example the fifth page sheet, the first, second, third, and fourth page sheets will be turned aside so that the sheltering and reflecting of the detecting signals emitted from the respective four signal emitters 71 will in cleared. Therefore, the audio means 30 may detect that the reader is reading the fifth page sheet of the voice book 10, so that the audio means 30 can precisely select the sound message of the content of the fifth page sheet to convert to the speaking sound and broadcast through the speaker.

Figure 5:
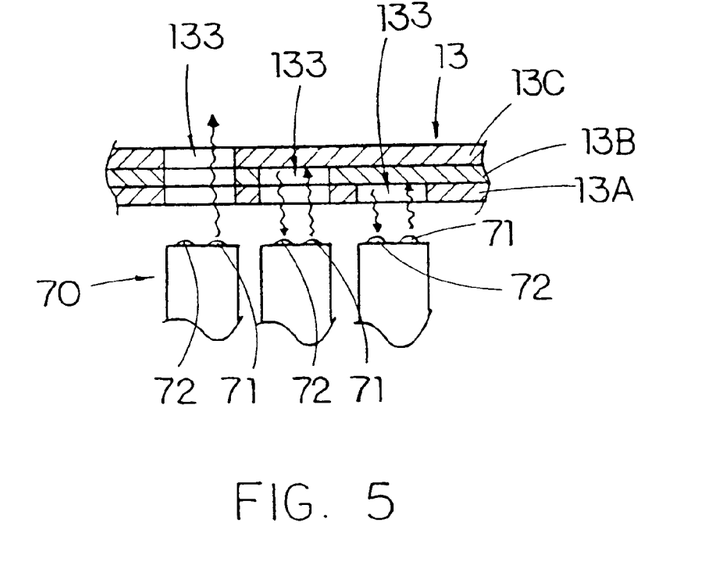
FIG. 5 is a schematic view to illustrate the detecting means incorporating with several page sheets according to the above first preferred embodiment of the present invention.

It is worth to emphasis that the tab member can also be substituted by a though hole 133 formed on each page sheet. As shown in FIGS. 5, the lowest page sheet 13a has a series of through holes aligning with respect to the number and positions of the pairs of signal emitter and receiver 71, 72. Each upper page sheet 13b has one hole less than the number of through hole provided on a lower page sheet 13a. The topmost page sheet 13c has only one through hole 133. In this mode, all the detecting signals will be blocked when the voice book 10 is closed. However, when a particular page sheet 13 is turned in, the blocking of the respective detecting signal will be cleared, so that the audio means can precisely detect which is the turned in page sheet, for example the topmost page sheet 13c in FIG. 5, and broadcast the sound content with respect to that page sheet 13c. It is an equivalent modification of the preferred embodiment of the present invention.

Figure 6:
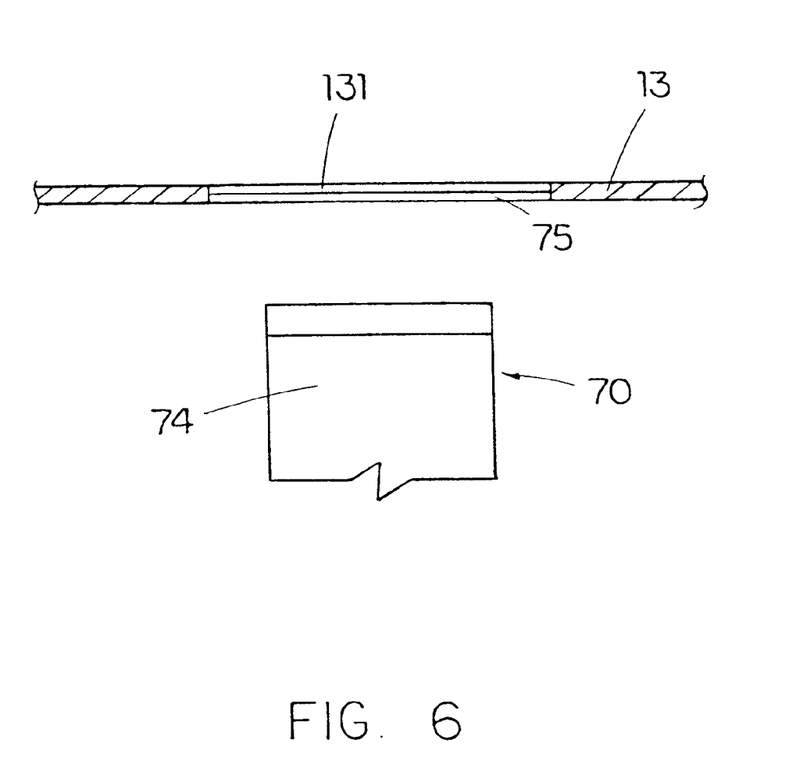
FIG. 6 is a schematic view of an alternative mode of the above first preferred embodiment of the present invention.

As shown in FIG. 6, an alternative mode of the detecting means 70 of the above First preferred embodiment is illustrated, wherein a plurality magnetic field sensors 74 are used to respectively substitute the plurality pairs of signal emitter and receiver 71, 72 disclosed above. Moreover, a plurality of magnetic field generators 75 are mounted on the bottom sides of the tab members 131 respectively. Therefore, when voice book 10 is closed, each of the magnetic field sensors 74 detects a specific magnetic field generated from the respective magnetic field generator 75 so that the audio means 30 will be deactivated and will not provide any speaking sound. However, when the voice book 10 is turned into a particular page sheet 13, that tab member 131 as well as the magnetic filed generator 75 mounted thereon will be turned over, the magnetic filed generated by the respective magnetic field generator 75 will not be sensed and the audio means 30 will react to broadcast the sound content with respect to that particular page sheet 13.

Figure 7:
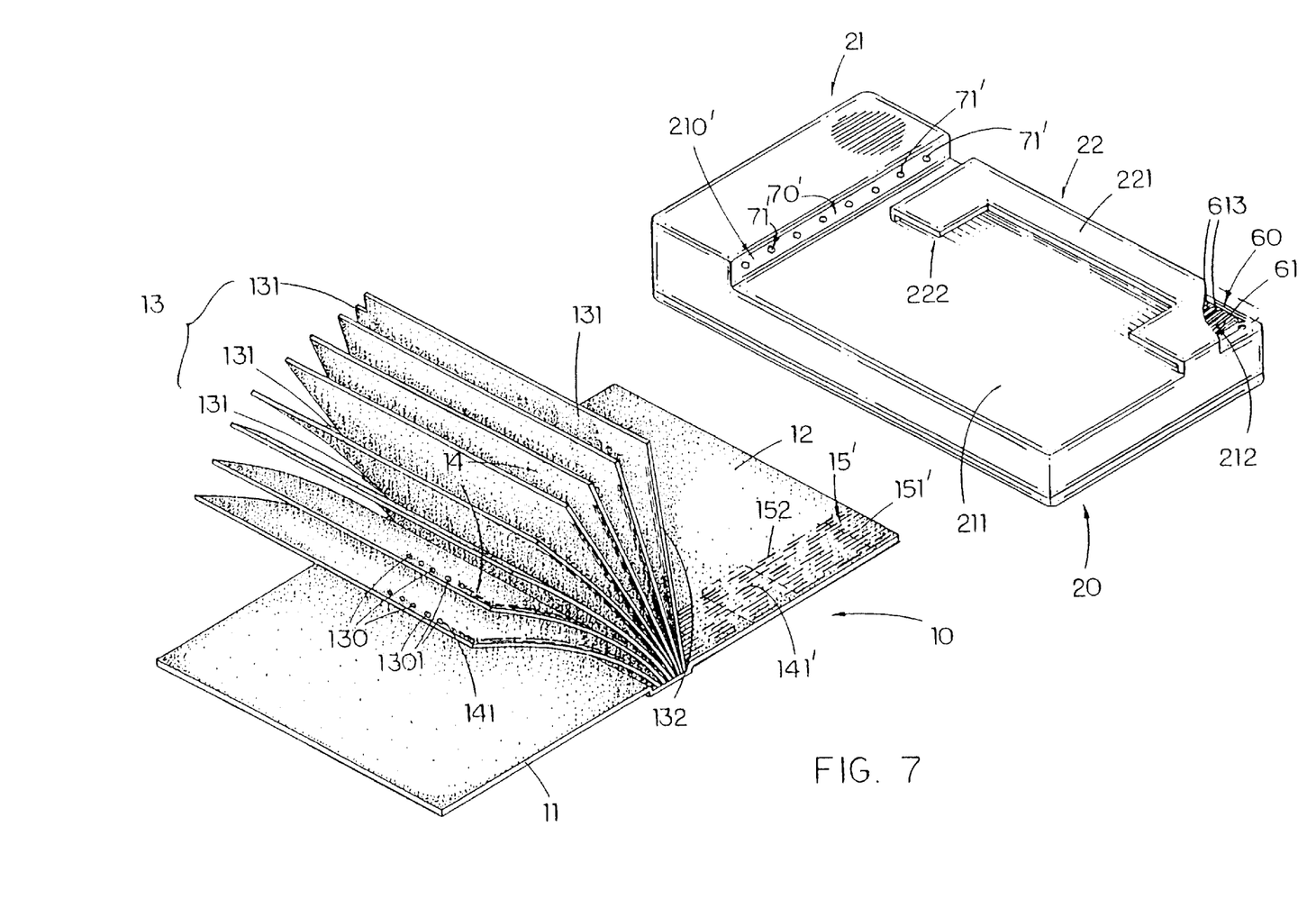
FIG. 7 is a perspective view of a second preferred embodiment in accordance with the present invention.

As shown in FIG. 7, a voice book system according to a second preferred embodiment of the present invention is illustrated, which is a modification of the above first preferred embodiment that has a similar structure with the above first preferred embodiment except the following features. The information storing means 14 of the voice book system of the second preferred embodiment comprises only a single memory chip 141' installed inside the back cover 12 of the voice book 10. The memory chip 141' stores a plurality of segments of sound message with respect to the written content of all page sheets and is connected to a book connector 15' which is also affixed to the outer bottom corner of the back cover 12 through a plurality of contact-strip terminals 151'.

Moreover, the detecting means 70' of the second preferred embodiment comprises a plurality of mechanical switches such as contact switches 71', which are spacedly mounted on a vertical wall 210' adjacent to a top side edge of the top platform 211, to substitute the plurality pair of signal emitters 71 and signal receivers 72 as disclosed in the above first preferred embodiment. The contact switches 71' are electrically connected to the audio means 30. Therefore, when the voice book 10 held on the housing 21 of the sound generating device 20 is closed, all the tab members 131 are in contact with the contact switches 71' respectively, so that the audio means 30 (as shown in FIG. 2) is deactivated and will not provide any sound. If the voice book 10 is opened and turned in to a particular page sheet 13, for example the fifth page sheet, the first, second, third, and fourth page sheets will be turned aside so that the respective contact switch 71' is non-contact with the tab member 131 of the fifth page sheet. Therefore, the audio means 30 may detect that the reader is reading the Fifth page sheet 13 of the voice book 10 and precisely select the sound message of the content of the fifth page sheet 13 stored in the memory chip 141' to convert to the speaking sound and broadcast through the speaker 40.

Accordingly, the users of the voice book system of the present invention can read the written content of the voice book and, at the same time, listen to the sound content of the voice book by equipping with the sound generating device. Therefore, the pre-school children may also understand and learn the content of the voice book by listening to the sound content of the voice book. Undoubtedly, it is an excellent way for the children to study vocabularies and pronunciation. Moreover, the blind people can also listen to the content of the voice book and study a lot faster. If the sound content is a background music, the reader can enjoy a lot more reading fun.

What is claimed is:

1. A voice book system, comprising a voice book which comprises a front cover, a back cover and a plurality of page sheets bound between said front cover and said back cover for respectively printing a predetermined content or information thereon, wherein said voice book further contains an information storing means for storing a plurality of sound messages with respect to said content of each of said page sheets and a book connector, and a sound generating device, comprising a housing, a book holder provided on said housing for connecting said voice book with said housing by holding said back cover of said voice book in position, an audio means which is installed inside said housing for converting said sound messages transmitted from said voice book to speaking sound, at least a speaker installed inside said housing for boardcasting said speaking sound, a power source electrically connected with said audio means, a device connector, which is electrically connected with said book connector when said voice book is held on top of said housing by said book holder, for transmitting said sound messages stored in said information storing means to said audio means, and a detecting means which is electrically communicated with said audio means for detecting which of said page sheets of said voice book is turned in so as to activate said audio means to select said particular sound message with respect to said content of said turned in page sheet and convert said particular sound message to said speaking sound to broadcast through said speaker.

2. A voice book system, as recited in claim 1, wherein said information storing means comprises a plurality of memory chips having a predetermined thickness, each page sheet comprising a sheet body having a thickness at least equal to said thickness of said memory chip, in which each of said sheet bodies has a cavity to receive one of said memory chips therein, a sound content which is a sound message with respect to a written content of each of said page sheets being stored in said respective memory chip.

3. A voice book system, as recited in claim 2, wherein said book connector comprises a plurality of electrical contact-strip terminals adjacently aligned in parallel manner, and said book connector is affixed to an outer bottom corner of an exterior side of said back cover, moreover, a plurality of electrical wires are respectively connected between said contact-strip terminals and said memory chips so as to electrically connect each of said memory chips with each of said contact-strip terminals.

4. A voice book system, as recited in claim 3, wherein said housing has a top platform for supporting said back cover of said voice book to flatly sit thereon, said book holder comprising a pocket shelter raised above a side edge of said top platform to define a receiving pocket between said top platform and said pocket shelter, wherein a height of said receiving pocket must be at least equal to said thickness of said back cover of said voice book, so that an outer side portion of said back cover of said voice book is able to be fitly inserted into said receiving pocket.

5. A voice book system, as recited in claim 4, wherein said top platform has a communication opening which is positioned at a side corner of said top platform and underneath said pocket shelter.

6. A voice book system, as recited in claim 5, wherein said audio means, which is installed inside said housing, comprises a circuit board electrically connected with said speaker and said power source, and a switch for switching a power supply of said circuit board on or off.

7. A voice book system, as recited in claim 6, said device connector comprises a plurality of electrical contact springs disposed at said communication opening of said top platform, each of said contact springs has a connected leg electrically connected to said circuit board and an elongated arm having a V-shaped tip upwardly extended into said receiving pocket, so that when said outer side portion of said back cover of said voice book is inserted into said receiving pocket of said housing, said contact-strip terminals of said book connector respectively press down said V-shaped tips of said contact springs to a lower position, and that each contact spring is in good electrical contact with said respective contact-strip terminal, moreover, each of said resilient contact springs has a tendency to spring back to its upper position that renders each of said contact propping against said respective contact-strip terminal so as to ensure good electrical connection.

8. A voice book system, as recited in claim 7, wherein said detecting means comprises a plurality pair of signal emitters and signal receivers disposed along a side edge of said housing, and each said pair of said signal emitter and signal receiver, which are electrically connected to said audio means, must be positioned proximately, wherein a detecting signal is continuously emitted upwardly from said signal emitter when said switch is turned on and said back cover of said voice book is held in position on said housing, moreover each of said page sheets has a tab member which is protruded outwardly from an edge side thereof and disposed staggeredly, in which each of said tab members is extended just above a respective pair of said signal emitter and signal receiver so as to shelter said detecting signal emitted from said corresponding signal emitter and reflect said detecting signal to said proximate signal receiver, whereby when said voice book held on said housing of said sound generating device is closed, said detecting signals emitted from all said signal emitters are sheltered by said tab members and reflected toward said signal receivers, and at that moment, said audio means is deactivated and does not provide any sound, however, when said voice book is opened and turned in to a particular page sheet, said particular page sheet is turned aside so that said sheltering and reflecting of said detecting signal emitted from said respective signal emitter is cleared, so that said audio means precisely selects said sound message with respect to said particular page sheet and converts said selected sound message to said speaking sound to broadcast through said speaker.

9. A voice book system, as recited in claim 8, wherein said detecting signal is an infrared beam.

10. A voice book system, as recited in claim 3, wherein said detecting means comprises a plurality pair of signal emitters and signal receivers disposed along a side edge of said housing, and each said pair of said signal emitter and signal receiver, which are electrically connected to said audio means, must be positioned proximately, wherein a detecting signal is continuously emitted upwardly from said signal emitter when said switch is turned on and said back cover of said voice book is held in position on said housing, moreover each of said page sheets has a tab member which is protruded outwardly from an edge side there of and disposed staggeredly, in which each of said tab members is extended just above an respective pair of said signal emitter and signal receiver so as to shelter said detecting signal emitted from said corresponding signal emitter and reflect said detecting signal to said proximate signal receiver, whereby when said voice book held on said housing of said sound generating device is closed, said detecting signals emitted from all said signal emitters are sheltered by said tab members and reflected toward said signal receivers, and at that moment, said audio means is deactivated and does not provide any sound, however, when said voice book is opened and turned in to a particular page sheet, said particular page sheet is turned aside so that said sheltering and reflecting of said detecting signal emitted from said respective signal emitter is cleared, so that said audio means precisely selects said sound message with respect to said particular page sheet and converts said selected sound message to said speaking sound to broadcast through said speaker.

11. A voice book system, as recited in claim 5, said device connector comprises a plurality of electrical contact springs disposed at said communication opening of said top platform, each of said contact springs has a connected leg electrically connected to said circuit board and an elongated arm having a V-shaped tip upwardly extended into said receiving pocket, so that when said outer side portion of said back cover of said voice book is inserted into said receiving pocket of said housing, said contact-strip terminals of said book connector respectively press down said V-shaped tips of said contact springs to a lower position, and that each contact spring is in good electrical contact with said respective contact-strip terminal, moreover, each of said resilient contact springs has a tendency to spring back to its upper position that renders each of said contact springs propping against said respective contact-strip terminal so as to ensure good electrical connection.

12. A voice book system, as recited in claim 11, wherein said detecting means comprises a plurality pair of signal emitters and signal receivers disposed along a side edge of said housing, and each said pair of said signal emitter and signal receiver, which are electrically connected to said audio means, must be positioned proximately, wherein a detecting signal is continuously emitted upwardly from said signal emitter when said switch is turned on and said back cover of said voice book is held in position on said housing, moreover each of said page sheets has a tab member which is protruded outwardly from an edge side thereof and disposed staggeredly, in which each of said tab members is extended just above a respective pair of said signal emitter and signal receiver so as to shelter said detecting signal emitted from said corresponding signal emitter and reflect said detecting signal to said proximate signal receiver, whereby when said voice book held on said housing of said sound generating device is closed, said detecting signals emitted from all said signal emitters are sheltered by said tab members and reflected toward said signal receivers, and at that moment, said audio means is deactivated and does not provide any sound, however, when said voice book is opened and turned in to a particular page sheet, said particular page sheet is turned aside so that said sheltering and reflecting of said detecting signal emitted from said respective signal emitter is cleared, so that said audio means precisely selects said sound message with respect to said particular page sheet and converts said selected sound message to said speaking sound to broadcast through said speaker.

13. A voice book system, as recited in claim 5, wherein said detecting means comprises a plurality pair of signal emitters and signal receivers disposed along a side edge of said housing, and each said pair of said signal emitter and signal receiver, which are electrically connected to said audio means, must be positioned proximately, wherein a detecting signal is continuously emitted upwardly from said signal emitter when said switch is turned on and said back cover of said voice book is held in position on said housing, moreover each of said page sheets has a tab member which is protruded outwardly from an edge side thereof and disposed staggeredly, in which each of said tab members is extended just above a respective pair of said signal emitter and signal receiver so as to shelter said detecting signal emitted from said corresponding signal emitter and reflect said detecting signal to said proximate signal receiver, whereby when said voice book held on said housing of said sound generating device is closed, said detecting signals emitted from all said signal emitters are sheltered by said tab members and reflected toward said signal receivers, and at that moment, said audio means is deactivated and does not provide any sound, however, when said voice book is opened and turned in to a particular page sheet, said particular page sheet is turned aside so that said sheltering and reflecting of said detecting signal emitted from said respective signal emitter is cleared, so that said audio means precisely selects said sound message with respect to said particular page sheet and converts said selected sound message to said speaking sound to broadcast through said speaker.

14. A voice book system, as recited in claim 6, wherein said detecting means comprises a plurality pair of signal emitters and signal receivers disposed along a side edge of said housing, and each said pair of said signal emitter and signal receiver, which are electrically connected to said audio means, must be positioned proximately, wherein a detecting signal is continuously emitted upwardly from said signal emitter when said switch is turned on and said back cover of said voice book is held in position on said housing, moreover each of said page sheets has a tab member which is protruded outwardly from an edge side thereof and disposed staggeredly, in which each of said tab members is extended just above a respective pair of said signal emitter and signal receiver so as to shelter said detecting signal emitted from said corresponding signal emitter and reflect said detecting signal to said proximate signal receiver, whereby when said voice book held on said housing of said sound generating device is closed, said detecting signals emitted from all said signal emitters are sheltered by said tab members and reflected toward said signal receivers, and at that moment, said audio means is deactivated and does not provide any sound, however, when said voice book is opened and turned in to a particular page sheet, said particular page sheet is turned aside so that said sheltering and reflecting of said detecting signal emitted from said respective signal emitter is cleared, so that said audio means precisely selects said sound message with respect to said particular page sheet and converts said selected sound message to said speaking sound to broadcast through said speaker.

15. A voice book system, as recited in claim 7, wherein each of said page sheets has a tab member which is protruded outwardly from an edge side thereof and disposed staggeredly, and said detecting means comprises a plurality magnetic field sensors which are disposed along a side edge of said housing and electrically connected to said audio means, and a plurality, of magnetic field generators which are mounted on said bottom sides of said tab members respectively, in which each of said magnetic field generators must be positioned just above one of said magnetic field sensors, therefore, when said voice book is closed, each of said magnetic field sensors detects a specific magnetic field generated from said respective magnetic field generator so that said audio means is deactivated and does not provide any speaking sound, however, when said voice book is turned into a particular page sheet of said page sheets, said respective tab member as well as said magnetic field generator mounted thereon is turned over, so that said magnetic field generated by said respective magnetic field generator is not sensed and said audio means reacts to broadcast said sound content with respect to that particular page sheet.

16. A voice book system, as recited in claim 1, wherein said housing has a top platform for supporting said back cover of said voice book to flatly sit thereon, said book holder comprising a pocket shelter raised above a side edge of said top platform to define a receiving pocket between said top platform and said pocket shelter, wherein a height of said receiving pocket must be at least equal to said thickness of said back cover of said voice book, so that an outer side portion of said back cover of said voice book is able to be fitly inserted into said receiving pocket.

17. A voice book system, as recited in claim 1, wherein said audio means, which is installed inside said housing, comprises a circuit board electrically connected with said speaker and said power source, and a switch for switching a power supply of said circuit board on or off.

18. As voice book system, as recited in claim 1, wherein said detecting means comprises a plurality pair of signal emitters and signal receivers disposed along a side edge of said housing, and each said pair of said signal emitter and signal receiver, which are electrically connected to said audio means, must be positioned proximately, wherein a detecting signal is continuously emitted upwardly from said signal emitter when said switch is turned on and said back cover of said voice book is held in position on said housing, moreover each of said page sheets has a tab member which is protruded outwardly from an edge side thereof and disposed staggeredly, in which each of said tab members is extended just above a respective pair of said signal emitter and signal receiver so as to shelter said detecting signal emitted from said corresponding signal emitter and reflect said detecting signal to said proximate signal receiver, whereby when said voice book held on said housing of said sound generating device is closed, said detecting signals emitted from all said signal emitters are sheltered by said tab members and reflected toward said signal receivers, and at that moment, said audio means is deactivated and does not provide any sound, however, when said voice book is opened and turned in to a particular page sheet, said particular page sheet is turned aside so that said sheltering and reflecting of said detecting signal emitted from said respective signal emitter is cleared, so that said audio means precisely selects said sound message with respect to said particular page sheet and converts said selected sound message to said speaking sound to broadcast through said speaker.

19. A voice book system, as recited in claim 18, wherein said detecting signal is an infrared beam.

20. A voice book system, as recited in claim 1, wherein each of said page sheets has a tab member which is protruded outwardly from an edge side thereof and disposed staggeredly, and said detecting means comprises a plurality magnetic field sensors which are disposed along a side edge of said housing and electrically connected to said audio means, and a plurality of magnetic field generators which are mounted on said bottom sides of said tab members respectively, in which each of said magnetic field generators must be positioned just above of said magnetic field sensors, therefore, when said voice book is closed, each of said magnetic field sensors detects a specific magnetic field generated from said respective magnetic field generator so that said audio means is deactivated and does not provide any speaking sound, however, when said voice book is turned into a particular page sheet of said page sheets, said respective tab member as well as said magnetic field generator mounted thereon is turned over, so that said magnetic field generated by said respective magnetic field generator is not sensed and said audio means reacts to broadcast said sound content with respect to that particular page sheet.

21. A voice book system, as recited in claim 1, wherein said information storing means comprises a memory chip installed inside said back cover to store a sound content which comprises a plurality of sound messages with respect to a written content of each of said page sheets, wherein said book connector comprises a plurality of electrical contact-strip terminals adjacently aligned in parallel manner, and said book connector is affixed to an outer bottom corner of an exterior side of said back cover, and that a plurality of electrical wires are connected between said contact-strip terminals and said memory chip so as to electrically connect each of said memory chip with each of said contact-strip terminals.

22. A voice book system, as recited in claim 21, wherein said housing has a top platform for supporting said back cover of said voice book to flatly sit thereon, said book holder comprising a pocket shelter raised above a side edge of said top platform to define a receiving pocket between said top platform and said pocket shelter, wherein a height of said receiving pocket must be at least equal to said thickness of said back cover of said voice book, so that an outer side portion of said back cover of said voice book is able to be fitly inserted into said receiving pocket.

23. A voice book system, as recited in claim 22, wherein said top platform has a communication opening which is positioned at a side corner of said top platform and underneath said pocket shelter.

24. A voice book system, as recited in claim 23, wherein said audio means, which is installed inside said housing, comprises a circuit board electrically connected with said speaker and said power source, and a switch for switching a power supply of said circuit board on or off.

25. A voice book system, as recited in claim 24, said device connector comprises a plurality of electrical contact springs disposed at said communication opening of said top platform, each of said contact springs has a connected leg electrically connected to said circuit board and an elongated arm having a V-shaped tip upwardly extended into said receiving pocket, so that when said outer side portion of said back cover of said voice book is inserted into said receiving pocket of said housing, said contact-strip terminals of said book connector respectively press down said V-shaped tips of said contact springs to a lower position, and that each contact spring is in good electrical contact with said respective contact-strip terminal, moreover, each of said resilient contact springs has a tendency to spring back to its upper position that renders each of said contact springs propping against said respective contact-strip terminal so as to ensure good electrical connection.

26. A voice book system, as recited in claim 25, wherein each of said page sheets has a tab member which is protruded outwardly from an edge side thereof and disposed staggeredly, and said detecting means comprises a plurality of contact switches, which are spacedly mounted on a vertical wall adjacent to a top side edge of said top platform and electrically connected to said audio means, wherein when said voice book held on said housing of said sound generating device is closed, all said tab members are in contact with said contact switches respectively, so that said audio means is deactivated and does not provide any sound, however, when said voice book is opened and turned in to a particular page sheet of said page sheets, said particular page sheet is turned aside and said respective contact switch does not contact with said tab member of said particular page sheet, so that said audio means precisely selects said sound message with respect to said particular page sheet and converts said selected sound message to said speaking sound to broadcast through said speaker.

* * * * *